United States Patent
Bartling

(10) Patent No.: US 7,695,840 B2
(45) Date of Patent: Apr. 13, 2010

(54) ELECTROCHEMICAL CELL HAVING A DEPOSITED GAS ELECTRODE

(75) Inventor: Brandon A. Bartling, Avon Lake, OH (US)

(73) Assignee: Eveready Battery Co., Inc., St. Louis, MO (US)

( * ) Notice: Subject to any disclaimer, the term of this patent is extended or adjusted under 35 U.S.C. 154(b) by 627 days.

(21) Appl. No.: 11/636,326

(22) Filed: Dec. 8, 2006

(65) Prior Publication Data

US 2008/0138696 A1    Jun. 12, 2008

(51) Int. Cl.
*H01M 2/16* (2006.01)
*H01M 4/86* (2006.01)
*H01M 4/88* (2006.01)
*H01M 12/06* (2006.01)
*B05D 5/12* (2006.01)

(52) U.S. Cl. .................. 429/27; 429/42; 429/44; 429/144; 29/623.5; 427/115; 502/101

(58) Field of Classification Search .......... 429/40, 429/41, 42, 44, 254; 502/101; 427/115; 29/623.5, 27, 144
See application file for complete search history.

(56) References Cited

U.S. PATENT DOCUMENTS

| | | | |
|---|---|---|---|
| 3,661,645 A | 5/1972 | Strier et al. | |
| 4,007,059 A * | 2/1977 | Witherspoon et al. | 429/40 X |
| 4,038,463 A * | 7/1977 | Lamarine et al. | 429/44 |
| 4,567,086 A * | 1/1986 | Fukuda et al. | 429/44 X |
| 5,242,565 A | 9/1993 | Winsel | |
| 5,415,959 A | 5/1995 | Pyszczek et al. | |
| 5,441,822 A * | 8/1995 | Yamashita et al. | 429/42 X |
| 5,652,043 A | 7/1997 | Nitzan | |
| 5,658,684 A | 8/1997 | Lake | |
| 5,707,499 A | 1/1998 | Joshi et al. | |
| 5,735,912 A | 4/1998 | Lake | |
| 5,735,914 A | 4/1998 | Lake | |
| 5,747,190 A | 5/1998 | Lake | |
| 5,747,191 A | 5/1998 | Lake | |
| 5,865,859 A | 2/1999 | Lake | |
| 5,902,467 A | 5/1999 | Wang et al. | |

(Continued)

FOREIGN PATENT DOCUMENTS

DE    1671456 A1    10/1971

(Continued)

OTHER PUBLICATIONS

Patent Cooperation Treaty (PCT), International Search Report and Written Opinion for Application No. PCT/US2007/024186, filed Nov. 19, 2007, mailed Apr. 4, 2008, European Patent Office, Netherlands.

*Primary Examiner*—Stephen J. Kalafut
(74) *Attorney, Agent, or Firm*—Russell H. Toye, Jr.

(57) ABSTRACT

An electrochemical cell comprising a gas electrode, including a deposited layer, and a counter electrode. The gas electrode is an electrode that either utilizes a gas as the active material that is reduced by the gas electrode or produces a gas by oxidation at the gas electrode. In a preferred embodiment, the gas electrode is a thin film electrode including a deposited current collector and deposited active material oxidation or reduction layer. A control layer can be disposed between the gas electrode and the counter electrode to control the diffusion of electrolyte into the gas electrode. Methods for making electrochemical cells having gas electrodes are disclosed.

31 Claims, 2 Drawing Sheets

U.S. PATENT DOCUMENTS

| | | | |
|---|---|---|---|
| 5,906,661 A | 5/1999 | Lake | |
| 6,004,359 A | 12/1999 | Lake | |
| 6,025,089 A | 2/2000 | Lake | |
| 6,030,721 A | 2/2000 | Lake | |
| 6,045,942 A | 4/2000 | Miekka et al. | |
| 6,060,196 A | 5/2000 | Gordon et al. | |
| 6,280,871 B1 | 8/2001 | Tosco et al. | |
| 6,280,879 B1 | 8/2001 | Andersen et al. | |
| 6,379,835 B1 | 4/2002 | Kucherovsky et al. | |
| 6,426,590 B1 | 7/2002 | Chung et al. | |
| 6,461,761 B1 | 10/2002 | Moy et al. | |
| 6,468,691 B1 | 10/2002 | Malay et al. | |
| 6,492,295 B2 * | 12/2002 | Hitomi et al. | 429/42 X |
| 6,500,217 B1 | 12/2002 | Starz et al. | |
| 6,593,023 B2 | 7/2003 | Chang et al. | |
| 6,660,680 B1 | 12/2003 | Hampden-Smith et al. | |
| 6,689,191 B2 * | 2/2004 | Dunmead et al. | 75/336 |
| 6,753,108 B1 | 6/2004 | Hampden-Smith et al. | |
| 6,758,962 B1 | 7/2004 | Fitzgerald et al. | |
| 6,869,710 B2 | 3/2005 | Tzeng et al. | |
| 6,881,511 B1 | 4/2005 | Tosco et al. | |
| 6,911,412 B2 | 6/2005 | Hampden-Smith et al. | |
| 6,967,183 B2 | 11/2005 | Hampden-Smith et al. | |
| 7,008,706 B2 * | 3/2006 | Ovshinsky et al. | 429/44 X |
| 7,066,970 B2 | 6/2006 | Gilicinski et al. | |
| 7,066,976 B2 | 6/2006 | Hampden-Smith et al. | |
| 7,087,341 B2 | 8/2006 | Hampden-Smith et al. | |
| 2002/0095780 A1 | 7/2002 | Shadle et al. | |
| 2003/0165744 A1 | 9/2003 | Schubert et al. | |
| 2004/0101757 A1 | 5/2004 | Kii et al. | |
| 2004/0267190 A1 | 12/2004 | Tamarkin et al. | |
| 2005/0123833 A1 | 6/2005 | Schubert et al. | |
| 2005/0239917 A1 | 10/2005 | Nelson et al. | |
| 2005/0260492 A1 | 11/2005 | Tucholski et al. | |
| 2006/0115717 A1 | 6/2006 | Schubert et al. | |
| 2007/0224495 A1 | 9/2007 | Gibbons et al. | |
| 2008/0102360 A1 | 5/2008 | Stimits et al. | |
| 2008/0155813 A1 | 7/2008 | Dopp et al. | |

FOREIGN PATENT DOCUMENTS

| | | |
|---|---|---|
| EP | 0940869 A2 | 9/1999 |
| FR | 2879823 A | 6/2006 |
| JP | 60-041763 | 3/1985 |
| JP | 63290956 A | 11/1988 |
| JP | 1320784 A | 12/1989 |
| JP | 10-172606 A | 6/1998 |
| JP | 2009026752 A | 2/2009 |
| WO | 0036676 A | 6/2000 |
| WO | 0036677 A | 6/2000 |
| WO | 2007048253 A1 | 5/2007 |

* cited by examiner

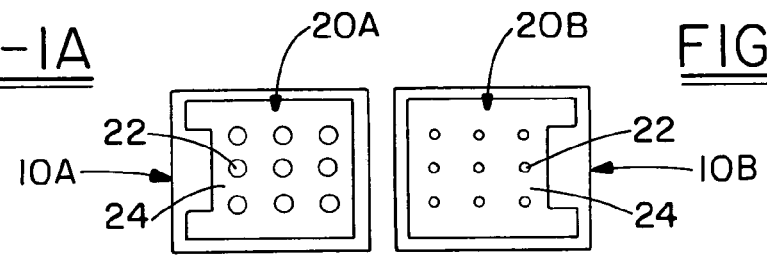
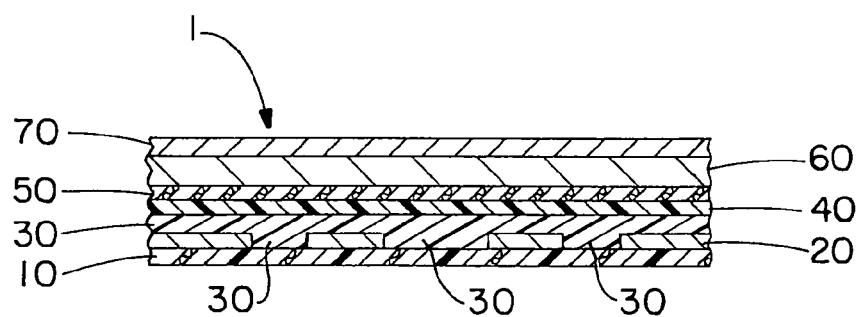

ELECTROCHEMICAL CELL HAVING A DEPOSITED GAS ELECTRODE

FIELD OF THE INVENTION

The present invention relates to an electrochemical cell comprising a gas electrode including a deposited layer. The gas electrode is an electrode that either utilizes a gas as the active material that is reduced by the gas electrode or produces a gas, such as by oxidation, at the gas electrode. In a preferred embodiment, the gas electrode is a thin film electrode including a deposited current collector and deposited catalytically active material oxidation or reduction layer. Methods for making electrochemical cells having gas electrodes are disclosed.

BACKGROUND OF THE INVENTION

Electrochemical cells have been created utilizing various forms of gas electrodes. A gas electrode is an electrode that utilizes a gas, such as oxygen, as an active material and is capable of reducing the gas at the electrode, or an electrode that produces a gas via an oxidation reaction at the gas electrode, see for example U.S. Pat. Nos. 5,242,565; 5,707,499 and 6,060,196, which are hereby incorporated by reference. Gas electrodes have been used in metal-air cells, fuel cells, oxygen generating cells and hydrogen generating cells, for example.

Gas electrode containing electrochemical cells such as metal-air cells are desirable for use in many applications including electronic devices, such as hearing aids, sensors, computers, calculators, and watches. For example, oxygen sensors utilizing metal-air cells such as zinc air cells are disclosed in U.S. Pat. Nos. 5,902,467 and 6,758,962, which are hereby incorporated by reference. Metal-air cells are desirable for use in devices as they offer relatively high energy density or output per volume as oxygen from air outside the cell can be utilized by the cell as the active material of a positive electrode (cathode), when compared to electrochemical cells wherein the entire charge of both the negative electrode (anode) active material and positive electrode active material are contained inside a sealed cell container.

Thin, relatively flat electrochemical cells have been proposed, wherein various layers have been applied to a substrate to form a portion of the cell. Various techniques have been utilized to form thin cells. With the continued miniaturization of technology, there is an ever increasing desire to make batteries thinner.

U.S. Pat. Nos. 7,066,976; 6,967,183; 6,911,412; 6,881,511 and 6,280,871, assigned or co-assigned on their faces to Cabot Corporation, and which are hereby incorporated by reference, relate to composite electrocatalyst powders reportedly useful in energy devices, such as batteries and fuel cells. The electrocatalyst powders are formed into a layer, often in combination with other materials as part of a device such as a fuel cell or battery. The method by which these materials are deposited reportedly has a strong influence on the characteristics of the deposited layer, which in turn reportedly has a strong influence on the performance of the device.

U.S. Pat. No. 6,379,835, which is hereby incorporated by reference and is assigned on its face to Morgan Adhesives Company, relates to a flexible thin film battery including a film layer and a porous cathode deposited on a portion of a film and a porous anode deposited on a portion of the film, with an electrolyte and separator layer positioned between the porous anode and the porous cathode. The electrolyte is preferably dried so the battery is activated when liquid contacts the electrolyte and separator layer. In a preferred embodiment, water swellable particles are included in the cell. The film layers are at least partially sealed around the edges, confining the anode, cathode, and electrolyte and separator layer. The method of producing such a battery preferably includes printing various inks in a pattern on a polymeric film.

U.S. Pat. Nos. 6,030,721; 6,004,359; 5,865,859 and 5,747,191, which are hereby incorporated by reference and are assigned to Micron Communications, Inc. on their faces, relate to, in one aspect, a method of making a battery includes fusing an alkali metal onto a patterned conductive layer. In another aspect, a method of forming a battery includes: a) providing a cathode base which comprises: a first nonconductive surface; a first conductive layer superjacent the first nonconductive surface; the first conductive layer comprising a first area; and a cathode layer superjacent the first conductive layer leaving at least a portion of the first area exposed; b) providing an anode base which comprises: a second nonconductive surface; a second conductive layer superjacent the first nonconductive surface, the second conductive layer comprising a second area; and an anode layer superjacent the second conductive layer leaving at least a portion of the second area exposed, the anode layer comprising an alkali metal; and c) aligning and coupling the anode layer of the anode base with the cathode layer of the cathode base, wherein the aligning and coupling leaves at least a portion of the first area and at least a portion of the second area exposed for electrical connection. The invention also encompasses batteries formed by such methods. In another aspect, it is directed to batteries having a nonconductive layer next to a conductive layer wherein the conductive layer comprises a cured conductive ink. The cathode is against the conductive ink layer.

U.S. Patent Application Publication Nos. 2006/0115717 and 2003/0165744, assigned to Eveready Battery Co., Inc., and which are hereby incorporated by reference, relate to a flat, flexible electrochemical cell and describe various aspects of the flat, flexible electrochemical cell. A printed anode is provided that obviates the need for a discrete anode current collector, thereby reducing the size of the battery. An advantageous electrolyte is provided that enables the use of a metallic cathode current collector, thereby improving the performance of the battery. Printable gelled electrolytes and separators are provided, enabling the construction of both co-facial and co-planar batteries. Cell contacts are provided that reduce the potential for electrolyte creepage in the flat, flexible electrochemical cells of the within invention.

U.S. Patent Application Publication No. 2005/0260492 to Tucholski et al., and which is hereby incorporated by reference, relates to a thin printed flexible electrochemical cell with a high moisture and oxygen barrier polymer film sealed and folded package featuring a printed cathode deposited on a highly conductive carbon printed cathode collector with a zinc foil anode or printed anode placed adjacent to the cathode. After the cell components are added to the special laminated polymer substrate, the web is processed automatically on a modified high-speed commercial horizontal pouch filling machine to complete the cell assembly process. In this process a starch coated paper separator layer may be inserted over the anode and the cathode, and then the aqueous electrolyte solution is added to the cell. To complete the process, all four edges of the cell are heat sealed to confine the cell components within the cell cavity and each cell is trimmed off the continuous web.

In view of the above, it would be desirable to provide a relatively thin film electrochemical cell, including a gas electrode that is versatile and can be mass produced by a process comprising one or more deposition steps.

SUMMARY OF THE INVENTION

An object of the present invention is to provide an electrochemical cell comprising a gas electrode, either a gas consuming or gas generating electrode and a counter electrode, wherein cell examples include metal-air cells, fuel cells, oxygen generating cells, and hydrogen generating cells.

A further object of the present invention is to provide a metal-air electrochemical cell comprising a gas consuming electrode, preferably wherein the gas consumed is oxygen, comprising one or more deposited coatings.

Yet another object of the present invention is to provide an electrochemical cell comprising a gas generating electrode, wherein the gas generated is preferably oxygen or hydrogen, and when the gas electrode comprises one or more deposited coatings.

Still another object of the present invention is to provide a gas electrode comprising at least one of a deposited current collector coating and a deposited catalytically active material coating. In a preferred embodiment the catalytically active material coating is derived from a composition comprising unmodified activated carbon, a binder and a carrier.

A further object of the present invention is to provide a gas electrode comprising an air permeable electrode support, current collector coating deposited on a portion of the electrode support, and a catalytically active material coating deposited on a portion of the electrode support and contacting the current collector coating.

Yet another object is to provide an electrochemical cell comprising a gas electrode, wherein a polytetrafluoroethylene coating is provided between the gas electrode and a counter electrode of the cell. In one embodiment, the polytetrafluoroethylene coating is located between the gas electrode and a separator present in the cell between the gas electrode and the counter electrode. In a further embodiment, the polytetrafluoroethylene coating is located between the gas electrode and the counter electrode, with the polytetrafluoroethylene coating functioning as a separator and no other separator present.

Another object of the present invention is to provide methods for forming electrochemical cells comprising a gas electrode, wherein the gas electrode is formed including the steps of providing an air permeable electrode support, and depositing at least one of a current collector and a catalytically active material coating on a portion of the electrode support. In a preferred embodiment, both the current collector coating and active material reactive coating are deposited on a portion of the electrode support and are in contact with each other.

Still a further object of the present invention is to provide a method for forming an electrochemical cell including the step of depositing a catalytically active material coating on a portion of an electrode support derived from a composition comprising activated carbon, a binder, and a carrier solvent.

In one aspect of the invention, an electrochemical cell comprises a gas electrode, wherein the gas electrode is a gas consuming or gas generating electrode, and a counter electrode, wherein the gas electrode comprises an air permeable electrode support, a current collector coating deposited on a portion of the electrode support, said coating derived from a composition comprising a conductive material, a current collector binder, and a current collector carrier, and a catalytically active material coating deposited on a portion of the electrode support, said active material coating derived from a composition comprising activated carbon, an active material binder, and an active material carrier, wherein at least a portion of said active material coating contacts the current collector coating.

Another aspect of the invention is a method for forming an electrochemical cell, comprising the steps of providing an air permeable electrode support, depositing a current collector coating on a portion of the electrode support from a current collector solution composition, and depositing an active material coating on a portion of the electrode support from an active material mixture solution composition comprising activated carbon, an active material binder, and an active material carrier, wherein at least a portion of said active material coating contacts the current collector coating.

The present invention achieves these and other objectives which will become apparent from the description that follows.

BRIEF DESCRIPTION OF THE DRAWINGS

The invention will be better understood and other features and advantages will become apparent by reading the detailed description of the invention, taken together with the drawings, wherein:

FIGS. 1A-1D illustrate top views of different embodiments of electrode supports each having a current collector deposited thereon, particularly illustrating areas free of current collector material having different configurations;

FIG. 2 is a partial cross-sectional side view of one embodiment of an assembled cell including a gas electrode of the present invention.

DETAILED DESCRIPTION OF THE INVENTION

Figure 3:
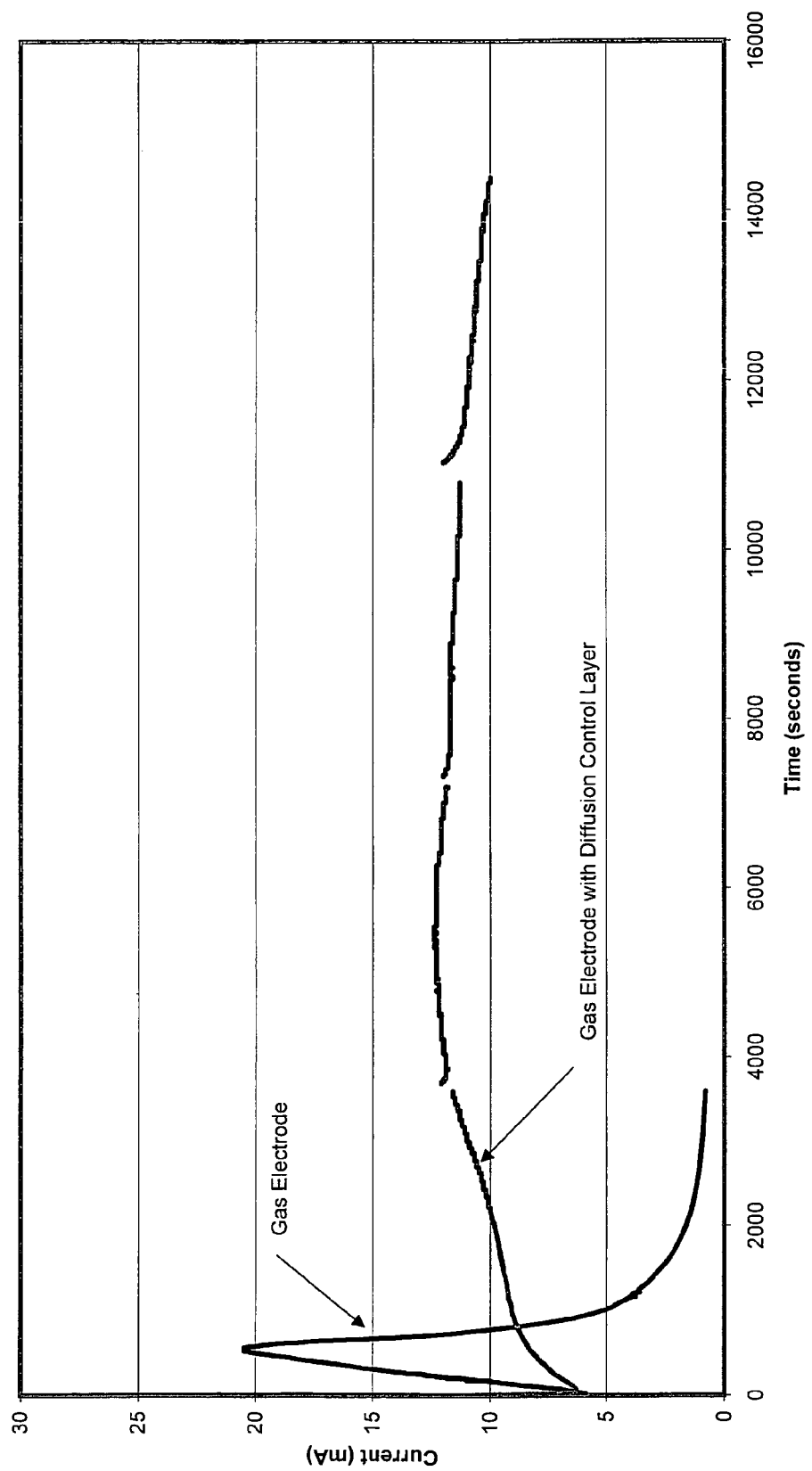
FIG. 3 is a plot of current as a function of time for two gas electrodes, wherein one of the electrodes included an electrolyte diffusion control layer.

Electrochemical cells of the present invention include a gas electrode and a counter electrode. The gas electrode can be a gas consuming electrode or a gas generating electrode.

A gas consuming electrode utilizes a gas, such as oxygen, as an active material that is reduced at the gas electrode. Oxygen can be supplied to the gas consuming electrode from atmospheric air from outside the cell that can be admitted to the cell through one or more air apertures in the cell housing. For example, as known in the art, in an alkaline metal-air electrochemical cell, the oxygen is reduced at the gas consuming electrode (the positive electrode) and a counter electrode (the negative electrode) can comprise a metal, such as zinc, as an active material that is oxidized.

A gas generating electrode produces gas by oxidation at the gas electrode. Examples of gasses capable of being generated by a gas generating electrode include oxygen and hydrogen. For example, a gas generating cell can be provided, such as an alkaline cell having a counter electrode comprising a metal oxide, wherein, when current is forced to flow through the cell, the metal oxide is reduced to a lower oxidation state or the corresponding metal, and oxygen is evolved at the gas generating electrode. In the case of an embodiment of a hydrogen generating cell wherein hydrogen is evolved from the gas generating electrode, such as in an alkaline cell, oxygen is excluded from the gas generating electrode and hydrogen gas is generated within the gas generating electrode when an electric current is enabled to flow through the cell. Further explanations regarding gas generating cells and gas generating electrodes, and materials therefrom, are set forth in U.S. Pat. Nos. 5,242,565; 5,707,499 and 6,060,196.

In one embodiment of the present invention, the gas electrode is formed using one or more steps which deposit one or more coatings on a portion of a substrate, such as an electrode support.

The term "deposited" as used herein refers to placing or applying a particulate, fluid (gas or liquid) or gel material on a substrate or surface, such as an electrode support. Methods of depositing materials on a substrate include, but are not limited to, deposition of dry materials such as by electrophotographic or electrostatic precipitation, deposition of a liquid, paste or the like such as by printing, for example inkjet printing, lithographic, flexographic, relief, gravure, rotogravure and intaglio printing, toner deposition, curtain coating, doctor blading, slot die, laser transfer, slurry deposition, syringe deposition, electrophoresis, evaporation, vapor deposition, sputtering, spray coating, stenciling, screen printing and vacuum deposition. The term "deposited" thus excludes assembly of formed components, such as a first layer to a second layer, for example, by lamination. Preferred deposition methods are printing, more preferably ink jet printing and screen printing.

Embodiments of electrode supports having various current collector configurations thereon are illustrated in FIGS. 1A through 1D. The electrode support is preferably a flexible substrate to which the one or more deposited layers will adhere with minimal or no cracking. The electrode support is preferably nonconductive. In a preferred embodiment, the electrode support is an air permeable, water impermeable layer or membrane. The electrode support hydrophobicity is also dependent on the catalytically active material utilized. That said, the electrode support may not be hydrophobic if the active material is sufficiently hydrophobic. Examples of suitable electrode support materials include polytetrafluoroethylene (PTFE) membranes or films and polytetrafluoroethylene coated paper available from Osmonics Inc. of Minnetonka, Minn. as laminated TEFLON® separator; polyester; and porous aluminum oxide. The electrode support has a thickness generally of about 6.24 µm (0.00025 inch) to about 203.2 µm (0.008 inch), and preferably from about 12.50 µm (0.0005 inch) to about 50.8 µm (0.002 inch). If the electrode support is too thick, when a cell is to function as a gas consuming electrode, poor performance can result as it is difficult to provide enough air to the gas consuming electrode giving inadequate air diffusion. If the electrode support is too thin, strength may be inadequate. The electrode support may not be sufficiently hydrophobic or can be excessively porous. The air permeability of the gas electrode support is application dependent. For example, when the gas electrode is a gas generating electrode, air permeability is relatively low. When the gas electrode is a gas consuming electrode, it is desired that the air permeability be relatively high in order to provide the catalytically active material with a sufficient amount of gas to effectively function. The electrode support chosen should have good mechanical integrity and stability in the cell.

In a further embodiment, the electrode support upon which layers of the gas electrode are deposited, such as the current collector or catalytically active material composition, is a layer that functions as a separator between adjacent electrodes of the cell, for example a gas electrode and a negative electrode. The separator electrode support is formed of a microporous, ionically conductive material, such as a paper or cellulosic separator, or surface treated polyethylene separator. Examples of a separator-type electrode support are an air-breathable, water-wettable membrane made from non-woven polypropylene treated with surfactant, such as CELGARD® 5550, and a hydrophobic polypropylene membrane, such as CELGARD® 3501, both available from Celgard, Inc. of Charlotte, N.C., USA.

One or more components of the gas electrode are deposited on the electrode support, for example, a current collector, a catalytically active material, a separator, or a combination thereof.

A current collector is deposited on one or more portions of the electrode support in a preferred embodiment. The current collector can be deposited utilizing any of the above noted deposition methods. It has been found beneficial to utilize a printing apparatus such as an inkjet printer, stencil, screen printer, or the like to form a desired pattern on the printing surface of the electrode support that will include the air electrode. There are several reasons for depositing a current collector in a patterned arrangement on the electrode support. The current collector is electrically conductive and serves as a portion of a circuit. The current collector accordingly is in contact with the catalytically active material of the gas electrode and also has one or more portions where contact to a device can be made. Further, forming a patterned current collector allows various air aperture patterns to be developed. As it is often undesirable to have all of the catalytically active material exposed to the atmosphere due to moisture exchange and carbonation, the current collector can be used to allow a desired number of air apertures to be in contact with portions of the electrode support while allowing good electrical contact to be made to the other portions of the catalytically active material. The type of pattern formed with the current collector can vary in order to balance properties of the gas electrode. For example, FIGS. 1A through 1D illustrate four current collectors 20A-20D having different patterns, each formed on an electrode support 10A-10D, respectively. Each current collector includes a void area 22 free of current collector material 24, and the catalytically active material can be applied on portions of the current collector and the electrode support 10 as described hereinbelow with a portion of the catalytically active material being applied in area 22 and in contact with electrode support 10.

As illustrated in FIGS. 1A through 1D, current collector 20A includes areas 22 which are formed as medium sized circles, current collector 20B includes relatively small sized circles and current collector 20D includes relatively large sized circles that are devoid of current collector material 24. Current collector 20C includes area 22 which is shaped as an elongated oval and is also devoid of current collector material 24. It is to be understood that patterns formed during depositing of the current collector on the electrode substrate can be in substantially any form as desired, such as cross-hatches and stripes.

The current collector is preferably applied to the electrode support as a solution that, depending on the viscosity, can be a relatively fluid liquid or a more viscous solution. Screen printing and inkjet printing are preferred methods of depositing the current collector. The viscosity of the solution will depend on the deposition method. The current collector is preferably formulated from materials sufficient to transfer electrons produced in the reduction of the gas electrode during discharge and to maximize current transfer while minimizing undesirable reactions with other cell component materials. The current collector is derived from a composition comprising a conductive material, a binder and a carrier in one embodiment.

The current collector conductive material can include an electrochemically stable metal or alloy, such as silver, copper, or nickel metal or alloy, with silver metal or alloy being preferred. The conductive material can also be an electrically conductive polymer such as polyaniline or conductive carbon if desired conductivity can be achieved. A preferred conductive material is a silver paste available from Ercon, Inc. of Wareham, Mass. as Ercon SILVER INK™.

The current collector binder has a function to hold and adhere the conductive material together at a desired location, i.e., on the surface of the electrode support after deposition. The binder can be conductive, for example, polyaniline, or nonconductive, for example, silicon, cyanoacrylate, or epoxy, with epoxy currently preferred as it is present in the Ercon SILVER INK™. In preferred embodiments, the ratio of conductive material to binder ranges from 5:1 to 8:1 by weight.

The current collector carrier is preferably a solvent suitable for suspending the conductive material and binder, prior to application to the electrode support. The current collector components are preferably substantially homogeneously dispersed in the carrier prior to application. The amount of a carrier utilized is dependent on the desired rheology or flow properties of the current collector solution, and in one embodiment is preferably about 10% by weight based on the total weight of the deposited current collector. The carrier assists in mixing of the components of the current collector and substantially evaporates after application of the current collector to the electrode support, optionally with drying. The carrier is preferably a liquid that is volatile at or above room temperature. Room temperature refers to an ambient temperature from about 20° C. (68° F.) to about 25° C. (77° F.). The carrier is preferably non-reactive with the conductive material and therefore does not degrade the same. Examples of suitable solvents include, but are not limited to, alcohol such as methanol and ethanol, ether acetate and acetone, with acetone being preferred.

One method for depositing the current collector on the electrode support is as follows. A screen or mask is formed, such as an acetate paper mask, having a desired pattern for the current collector thereon. The screen is fastened to an appropriate screen printing device with the electrode support placed under the screen. The solution utilized to form the current collector is deposited on top of the screen and the solution is forced through the screen and onto the substrate, preferably by a squeegee that traverses the screen. Thus, a pattern is transferred to the substrate, forming the current collector layer. The electrode support having the current collector solution thereon is subjected to a drying treatment to drive off the solvent, solidify, and adhere the current collector layer to the electrode support. The current collector is dried for a sufficient period of time at an effective temperature in order to substantially remove the solvent therefrom. Suitable drying temperatures and times have been found to range from about 20° C. to about 60° C. for a period of time from about 5 minutes to about 30 minutes. In one embodiment, the screen printing can be performed with a MPM 100 screen printer available from MPS International of Los Angeles, Calif. The current collector has a dry thickness generally up to about 50.8 µm (0.002 inch), and preferably from about 6.35 µm (0.00025 inch) to about 25.4 µm (0.001 inch). If the current collector is too thick, the integrity of the layer may be compromised and cracks can form. If the current collector is too thin, there may be a lack of electrical continuity required for efficient operation of the gas electrode.

After the current collector has been dried, the catalytically active material is applied to the electrode support. However, it is to be understood that the catalytically active material could be first applied to the electrode support and the current collector applied thereafter, so long as the gas electrode functions in a desired manner. Moreover, multiple layers of catalytically active material and current collector can be deposited in various orders if desired.

The catalytically active material composition in the case of a gas consuming electrode includes a substance that is catalytically reactive with the gas to be consumed. For example, activated carbon is a preferred catalytically active substance utilized when the gas to be consumed is oxygen. Graphitic carbon can also be utilized. In a preferred embodiment, the activated carbon utilized is type PWA™ from Calgon Carbon Corporation of Pittsburgh, Pa. The preferred activated carbon is believed to have a relatively high surface area, thereby providing a number of reaction sites for reduction of oxygen. The catalytically active substance can be present in the catalytically active material composition, on a dry basis, in an amount generally from about 50% to about 85% by weight, desirably from about 65% to about 70%, and preferably about 67.2% by weight based on the total weight of the catalytically active material. Generally, if too little activated carbon is present, not enough support structure is present, and the catalytically active material will not adequately cover the surface to which it is applied. If too much activated carbon is utilized, the amount of catalyst is low and the catalytic activity may not be high enough.

The catalytically active material composition preferably includes a binder. The binder is chosen so that it does not dissolve in contact with the electrolyte utilized in the cell, generally an aqueous based electrolyte. The binder of the catalytically active layer serves to hold or adhere the layer together at a desired location to which the material is applied. Examples of suitable binders include, but are not limited to, polymers such as polyvinylpyrrolidone and polyvinylbutyral, with a combination thereof being preferred. Other suitable binders are stable in the electrolyte, have good adhesion to the surface the catalytic material is deposited on, and can be dissolved in the carrier solvent of choice. The binder can be present in an amount generally from about 5% to about 15%, desirably from 7% to about 12%, and preferably in an amount of about 19% by weight, on a dry basis, based on the total weight of the catalytically active material. In a preferred embodiment, the binder is from about 40% to about 60% by weight of polyvinylpyrrolidone and from about 40% to about 60% by weight of polyvinylbutyral, and most preferably a 50/50 by weight mixture of polyvinylpyrrolidone and polyvinylbutyral. An overabundance of binder is preferably avoided as the catalytically active material solution will be too viscous and not as easily printable, whereas too little binder can cause the coating formed from the solution not to adhere to or adequately cover the surface on which it is deposited.

The catalytically active material optionally, but preferably, includes a catalyst which can make the reaction proceed at a faster rate. Preferred catalysts are relatively easy to disperse throughout the material mixture which, therefore, produces a relatively homogeneous electrode having a low variability in performance. Catalysts that can be utilized include manganese dioxide, cobalt macrocycles, copper oxide, or nanomaterials such as nano-nickel and nano-silver, with nanomaterial catalyst being preferred. In a preferred embodiment, the nano-material catalyst is dispersed directly into the solvent carrier utilized. This allows the nano-agglomerates to break down and separate. The catalytically active substance such as activated carbon can also be added to the carrier and the end product is a catalytically active material solution that has a well dispersed nano-catalyst enabling high reactivity. Nano-material catalysts are available from Quantum Sphere Inc. of Santa Ana, Calif. as QSI-NANO™ silver and QSI-NANO™ nickel. Typically the average particle size ranges from about 5 nm to about 60 nm with about 17 nm to about 26 nm preferred. The amount of catalyst, when present, ranges generally from about 2% to about 10%, and preferably is about 7.5% by weight on a dry basis, based on the total weight of a catalytically active material.

The catalytically active material solution further includes a carrier which is preferably a solvent. The carrier is primarily chosen so that it can dissolve the binder utilized but does not negatively impact the catalyst or the catalytically active substance such as the activated carbon. Additionally, the solvent should be relatively easy to work with and not difficult to remove from the material once it has been deposited onto a desired surface. Examples of suitable solvents include, but are not limited to, alcohol such as 1-pentanol and diacetone alcohol, acetone and certain other non-polar solvents. The amount of carrier utilized is dependent upon the desired viscosity of the catalytically active material solution to the carrier. The solution will not print well if the viscosity is too high. Too much carrier and the catalytically active material solution can be too runny and leak across the surface on which it is deposited to areas not intended to be coated. That said, the carrier is present in an amount preferably from about 47% to about 57% based on the total weight of the catalytically active material on a wet basis.

One embodiment of a preferred formulation for the catalytically active material is as follows:

| Catalytically Active Material Components | Wt. % of Wet Ink | Wt. % of Dry Ink |
| --- | --- | --- |
| Catalytically Active Substance (Calgon PWA ™ Carbon) | 33.3 | 67.2 |
| Catalyst (QSI-NANO ™ Silver/QSI-NANO ™ Nickel) | 3.7 | 7.5 |
| Carrier (1-Pentanol) | 53.5 | 6.3 |
| Binder (Polyvinylpyrrolidone) | 4.7 | 9.5 |
| Binder (Polyvinylbutyral) | 4.7 | 9.5 |

The catalytically active material solution is deposited on a desired surface, such as a portion of the electrode support and/or a portion of the current collector as desired. In one embodiment, the catalytically active material solution is screen printed in a manner analogous to the current collector described hereinabove and incorporated by reference. Preferably, the material solution is printed on top of desired areas of the current collector, with a portion thereof also contacting the electrode support due to the presence of the apertures or areas of material without current collector being present such as shown in FIG. 1. After the catalytically active material is applied to the desired surface, the material is dried to drive off substantially all the solvent carrier. Suitable drying times have been found to be 80 minutes at 60° C. or about 20 minutes at a temperature of about 80° C. The dried catalytically active material is preferably deposited to have a dry thickness that ranges from about 6.25 µm (0.00025 inch) to about 203.2 µm (0.008 inch) and preferably from about 25.4 µm (0.001 inch) to about 76.2 µm (0.003 inch). Generally, if the dry coating is too thick, the coating can crack and/or flake, and wherein the coating is too thin, the catalytically active material coating can flood with electrolyte and/or have insufficient reaction sites. Once dry, the gas electrode is complete and able to be assembled into a cell as desired.

The gas electrode has a thickness that generally ranges from 12.7 µm (0.0005 inch) to about 254 µm (0.010 inch) and preferably from about 25.4 µm (0.001 inch) to about 101.6 µm (0.004 inch). If the gas electrode is too thick, the electrode may be too rigid for some applications and may be difficult to process. Flaking of the materials of the electrode can also be a problem. Strength may be inadequate if the gas electrode is too thin. Moreover, when a gas electrode is too thin, there may be excessive permeability and the electrode may become flooded if not enough hydrophobicity is present within the electrode.

In yet a further embodiment of the present invention, an electrolyte diffusion control layer ("control layer" below), which can be a polymeric material layer, preferably a fluoropolymer layer, and more preferably a PTFE layer, is positioned between the gas electrode and the negative electrode of the cell to limit the diffusion of electrolyte into the gas electrode. It has been found that the catalytically active material layer can occasionally become flooded when too much electrolyte enters the catalytically active material layer, causing the cell to prematurely fail. A three phase region must be present at a certain location in the cell wherein a gas such as oxygen, catalyst and electrolyte are all present at the same time. If one of the components is missing, the reaction will not take place, such as when the cell is flooded with too much electrolyte, thereby preventing access of the gas to the catalyst. The control layer is somewhat hydrophobic and has been found to partially restrict the aqueous electrolyte from entering the electrode, thus minimizing flooding. At the same time, the control layer still allows the ionic transport necessary to achieve desired battery performance from the deposited gas electrode. The hydrophobicity and the electrolyte diffusion rate of the control layer can be selected based on the intended use of the battery.

The control layer can be a free film layer disposed between the gas electrode and the negative electrode, or can be deposited on a surface of either the gas electrode, negative electrode, or a separator if present. The control layer can thus be disposed between the gas electrode and a separator of the cell or can function as the separator between the gas electrode and negative electrode, wherein the cell is free of any further separator material disposed between the gas electrode and negative electrode. In a preferred embodiment, the control layer is deposited from an emulsion or solution of PTFE onto a surface of the gas electrode adapted to face the negative electrode. A preferred aqueous PTFE emulsion is available as TEFLON® PTFE TOPCOAT™ 852-202 from DuPont of Wilmington, Del. TOPCOA™ 852-202 is believed to contain sodium lauryl sulfate, toluene, diethylene glycol monobutyl ether, water, xylene, octylphenoxypolyethoxyethanol, polytetrafluoroethylene, and silicone resin. The thickness of the control layer is dependent on a number of factors including the desired hydrophobicity of the layer and resistance of the layer to ion transfer. The thickness of the PTFE layer ranges generally from 0.25 to about 1.5 µm and preferably is about 1 µm.

The control layer is preferably deposited by painting or spraying the solution, for example in the form of an aerosol spray, onto a desired surface of the cell, such as the gas electrode. The deposited layer is dried to remove any volatiles from the layer, for example at about 71° C. for about 30 minutes. Relatively high temperatures are avoided as the control layer can smear on the applied surface, the binder of any of the layers of the gas electrode can become softened and be displaced from the contacting surface, or the activated carbon may absorb some of the solvent from the control layer, or a combination thereof, causing a loss of effectiveness of the gas electrode.

The gas electrode is desirably assembled with a suitable counter electrode into an electrochemical cell. In one embodiment the gas electrode is a gas consuming positive electrode and the counter electrode is a negative electrode. The negative electrode casing can be a substrate, preferably a conductive substrate and including a material having sufficient mechanical strength for intended use. The negative electrode casing is preferably a metal of one or more layers. At least one of the layers should have a moderate to high overpotential such as copper, tin or zinc. In one such embodiment, the negative casing is a laminate material, comprising for example, from exterior layer to interior layer, nickel/stainless steel/nickel, tin/nickel/stainless steel/nickel/tin, tin/copper/stainless steel/tin, tin/nickel/stainless steel/copper/tin, stainless steel/copper, tin/stainless steel/copper/tin, tin/nickel/stainless steel/nickel/copper/tin, or nickel/stainless steel/nickel/copper, or variations thereof.

The negative electrode active material can be one or more of zinc foil, zinc powder, zinc fibers and expanded zinc.

A suitable electrolyte, such as an alkaline electrolyte, for example, potassium hydroxide can be utilized.

As indicated hereinabove, an electrochemical cell including a gas electrode of the present invention can optionally include a separator, generally a microporous, ionically conductive material, that electrically isolates the electrodes while enabling the flow of ions therebetween. When a separator is present, the separator can be a paper or cellulosic separator, a surface treated polyethylene separator, a gelled separator or a deposited separator.

The negative electrode and positive electrode can be connected or assembled as desired and thus formed into an electrochemical cell. In one embodiment, an epoxy can be utilized to seal the edges of the cell boundary to prevent materials from entering or leaving the cell, except as desired in the case of the gas electrode. Additional cell assembly methods utilize one or more of crimping, heat sealing and ultrasonic bonding.

FIG. 2 illustrates a partial cross-sectional representation of one embodiment of an electrochemical cell formed utilizing a gas electrode of the present invention. Cell 1 includes an electrode support 10 upon which a current collector 20 has been deposited. The current collector 20 was formed having void areas wherein catalytically active material 30 was deposited on electrode support 10 as well as on current collector 20 as illustrated. A fluoropolymer layer 40 was deposited upon catalytically active material layer 30. The negative electrode portion of the cell includes a casing 70 which is preferably a metal foil, and a negative electrode active material layer 60. A separator 50 is shown disposed between the negative electrode and the positive electrode and, as stated above, is optional when the fluoropolymer layer 40 is present.

In another embodiment, cell 1 in FIG. 2 can also have a positive casing (not shown) disposed adjacent to the electrode support 10, to provide increased rigidity or better protect the electrode support 10 from damage for example. In this embodiment the cell 1 will be provided with a means, such as air holes through the positive casing or channels on the inside surface of the casing between a source of air and the outer surface of the electrode support 10, to allow air to reach the outer surface of the electrode support 10.

Various methods can be utilized to extend the total useful life of an electrochemical cell containing a gas electrode of the present invention. One method is to control the time that the electrode is in contact with the electrolyte. The electrode cannot flood if electrolyte is not present or in contact therewith. When a user wants to use the device, the electrolyte can be added at the time of need, allowing the battery to function properly. Different ways of adding the electrolyte to the cell can include for example, using a syringe to inject the electrolyte through an injection port located on the outside of the cell. A segmented packaging system that contains the electrodes on one side with the electrolyte on the other side can be used. Separating the two sides is a crushable or breakable separator. When the user wants to active the battery, the separator is crushed or broken, and the electrolyte is transferred from the electrolyte stored inside of the packaging system to the area where the electrodes are, thereby activating the electrochemical cell. The electrolyte can optionally be contained within a diaphragm or casing which can be released into the desired areas of the electrochemical cell when needed by releasing the electrolyte from the diaphragm.

A further method for prolonging the life of the cell is the utilization of a gelled electrolyte. The gelled electrolyte can either be applied directly to the cell before assembly or can be introduced into the cell using one of the methods described above. It is desirable not to add too much gelling agent in order to prevent the creation of a good interface between the negative electrode and the positive electrode. Also, increased in electrolyte resistance can be noticed when the binder concentration becomes relatively high. In one embodiment, a binder concentration of 4% of carboxymethylcellulose (CMC) has been found suitable. Examples of other gelling agents include sodium polyacrylate and polyacrylic acid.

Electrochemical cells of the present invention, including a gas electrode, can be incorporated into various sensor assemblies, such as those sensors utilized in the medical industry, including glucose level sensors, or oxygen generators, etc. For example, such sensors can be incorporated in a relatively easy to apply form such as having the dimensions of typical adhesive bandages. Other elements of the sensor can be deposited on a surface of the electrochemical cell. Deposited circuitry can include detectors for detecting chemical concentrations of gasses, liquids or solids.

The described gas electrode provides acceptable performance while being usable over a relatively longer period of time. The inventions disclosed can be utilized to produce a flexible electrochemical cell that can be manufactured to fit a wide variety of forms which can thereby be utilized in numerous devices having different applications.

Example

Two gas electrodes were prepared, as described below, according to the teachings of the present invention, with one of the gas electrodes including an electrolyte diffusion control layer. Polytetrafluoroethylene coated paper from Osmonics Inc. of Minnetonka, Minn. was utilized as an electrode support. The electrode support had a thickness of 25 μm. An acetate paper mask was placed on a surface of the electrode support and a current collector was printed on the surface of the electrode support utilizing the pattern as shown in FIG. 1A using a MPM100 Screen Printer from MPS International of Los Angeles, Calif. The current collector composition utilized included Ercon SILVER INK™, which comprised silver particles and epoxy resin in a ratio of 28-30 parts silver to 70-72 parts epoxy by weight, and about 5 weight percent ethylene glycol monobutyl ether acetate as a carrier solvent. After printing, the mask was removed and the current collector was allowed to cure at room temperature for 20 minutes. The current collector had a dry thickness of 12.7 mm. A catalytically active material composition was printed on top of the current collector and in the apertures created by the mask, wherein connecting tabs to the current collector remained uncoated. The formulation for the catalytically active material composition utilized is set forth in the one embodiment of a pereferred formulation, as stated hereinabove. The catalytically active material composition was cured at about 60° C. for sixty minutes. The dry thickness of the catalytically active material composition layer was 50.8 μm.

One of the gas electrodes had an electrolyte diffusion control layer applied on the exposed surface of the catalytically active material composition. The control layer utilized was TEFLON® PTFE TOPCOA™ 852-202 from DuPont of Wilmington, Del. The control layer was applied for two seconds utilizing an air brush at 413 kPa (60 psi). The thickness of the control layer was about 1 μm. The control layer was dried at about 71° C. for thirty minutes.

Each gas electrode was tested utilizing the following procedure. The gas electrode was placed in a half-cell testing fixture and held in place with a faceplate utilizing four threaded screws. The electrolyte reservoir of the testing fixture was then filled with 33 weight percent potassium hydroxide.

The gas electrode was connected to the working electrode connection on an EG&G 273A potentiostat. The counter electrode connection of the potentiostat was connected to a piece of nickel mesh manufactured by Dexmet Corporation of Naugatuck, Conn. The nickel mesh was placed in the electrolyte reservoir so ionic contact was made with the gas electrode but not electrical contact. A third connection wire, the reference wire, was connected to a piece of zinc wire that was 99% pure. The zinc wire served as the reference electrode in the system. The reference electrode was in good ionic communication with the other two electrodes, but was not in electrical contact therewith.

The potentiostat was set to a constant voltage setting. The potentiostat held the potential between the gas electrode and the reference electrode at a stable 0.9V. The current that was generated by holding this potential was measured by the potentiostat and recorded.

A plot setting forth the test results in current versus time for the two gas electrodes described is set forth in FIG. 3. Testing showed that both gas electrodes are suitable for use in an electrochemical cell. The gas electrode including the electrolyte diffusion control layer was able to successfully limit the rate of electrolyte diffusion into the gas electrode when compared to the gas electrode without such a layer. The gas diffusion control layer allowed the gas electrode to run for a much longer period of time while maintaining a relatively high current.

In accordance with the patent statutes, the best mode and preferred embodiment have been set forth; the scope of the invention is not limited thereto, but rather by the scope of the attached claims.

What is claimed is:

1. An electrochemical cell, comprising:
   a gas electrode, wherein the gas electrode is a gas consuming or gas generating electrode;
   a counter electrode; and
   a separator disposed between the gas electrode and the counter electrode
   wherein:
   the gas electrode comprises:
      an air permeable electrode support; and
      at least two coatings deposited on the electrode support and comprising:
         a current collector coating deposited on a portion of the electrode support, said coating derived from a composition comprising a conductive material, a current collector binder, and a current collector carrier; and
         a catalytically active material coating deposited on a portion of the electrode support, said active material coating derived from a composition comprising activated carbon, an active material binder, and an active material carrier, wherein at least a portion of said active material coating contacts the current collector coating; and
      a control layer comprising a fluoropolymer is disposed between the gas electrode and the separator.

2. The cell according to claim 1, wherein the gas electrode is the gas generating electrode, and wherein the gas generating electrode is an oxygen generating electrode or a hydrogen generating electrode.

3. The cell according to claim 1, wherein the gas electrode is the gas consuming electrode.

4. The cell according to claim 1, wherein the electrode support comprises polytetra-fluoroethylene, polytetrafluoroethylene coated paper, polyester, or porous aluminum oxide.

5. The cell according to claim 4, wherein the electrode support comprises polytetrafluoroethylene coated paper.

6. The cell according to claim 1, wherein the current collector conductive material comprises an electrochemically stable metal or electrically conductive polymer, or a combination thereof.

7. The cell according to claim 6, wherein the current collector conductive material comprises silver, copper, or nickel metal or alloy, or a combination thereof.

8. The cell according to claim 6, wherein the current collector binder is conductive polyaniline.

9. The cell according to claim 6, wherein the current collector binder is non-conductive and comprises silicon, cyanoacrylate, epoxy, or a combination thereof.

10. The cell according to claim 6, wherein the binder comprises an epoxy.

11. The cell according to claim 1, wherein the current collector carrier comprises an alcohol or acetone.

12. The cell according to claim 1, wherein the current collector coating is a printed coating.

13. The cell according to claim 1, wherein the current collector coating comprises one or more void areas therein which have been filled with the catalytically active material coating, wherein the catalytically active material coating in the void area contacts the electrode support.

14. The cell according to claim 1, wherein the current collector coating includes one or more leads for electrical connection to a device.

15. The cell according to claim 1, wherein the catalytically active material binder comprises polyvinylpyrrolidone or polyvinylbutyral, or a combination thereof.

16. The cell according to claim 1, wherein the catalytically active material further includes a catalyst.

17. The cell according to claim 16, wherein the catalyst comprises manganese dioxide, or a nano metal.

18. The cell according to claim 17, wherein the nano metal catalyst is present and is nano-nickel, nab-manganese or nano-silver.

19. The cell according to claim 1, wherein the active material carrier comprises an alcohol.

20. The cell according to claim 1, wherein the catalytically active material coating has a dry thickness that ranges from 6.25 μm to 203.2 μm.

21. The cell according to claim 20, wherein the catalytically active material coating has a dry thickness that ranges from 25.4 μm to 76.2 μm.

22. The cell according to claim 1, wherein the catalytically active material coating is deposited on a portion of both of the electrode support and the current collector coating.

23. The cell according to claim 1, wherein the control layer is deposited on a surface of the gas electrode facing the counter electrode.

24. The cell according to claim 23, wherein a thickness of the control layer is from 0.25 μm to 1.5 μm.

25. The cell according to claim 24, wherein the control layer has a thickness of 1 micron.

26. A method for forming an electrochemical cell, comprising the steps of:
providing an air permeable electrode support;
depositing at least two coatings on the electrode support, the coatings comprising:
a current collector coating deposited on a portion of the electrode support from a current collector solution composition; and
an active material coating deposited on a portion of the electrode support from an active material mixture solution composition comprising activated carbon, an active material binder, and an active material carrier, wherein at least a portion of said active material coating contacts the current collector coating;
depositing a control layer comprising a fluoropolymer on a surface of the gas electrode;
providing a counter electrode;
providing an aqueous electrolyte; and
assembling the gas electrode and the counter electrode into a cell with a separator disposed therebetween and the control layer positioned between the gas electrode and the separator.

27. The method according to claim 26, wherein the active material coating further comprises a catalyst.

28. An electrochemical cell, comprising:
a gas consuming electrode comprising a current collector;
a counter electrode; and
a separator disposed between the gas electrode and the counter electrode;
wherein:
the gas consuming electrode comprises a catalytically active material layer on an electrode support, said catalytic layer comprising a catalytically active material and a binder, and said electrode support comprising an electrically nonconductive, air permeable, water impermeable layer; and
a discrete control layer comprising a hydrophobic fluoropolymer is disposed between adjacent surfaces of the gas consuming electrode and the separator.

29. The cell according to claim 28, wherein the control layer comprises a polytetrafluoroethylene layer.

30. The cell according to claim 28, wherein:
the gas consuming electrode is an oxygen reduction positive electrode;
the counter electrode is a negative electrode comprising zinc;
the cell further comprises an alkaline electrolyte;
the electrode support comprises a polytetrafluoroethylene membrane; and
the control layer consists essentially of the hydrophobic fluoropolymer.

31. The cell according to claim 28, wherein the current collector comprises an electrically conductive material deposited on the electrode support.

* * * * *